United States Patent
Niwa et al.

(10) Patent No.: US 11,254,348 B2
(45) Date of Patent: Feb. 22, 2022

(54) STEER-BY-WIRE SYSTEM

(71) Applicant: TOYOTA JIDOSHA KABUSHIKI KAISHA, Toyota (JP)

(72) Inventors: Satoru Niwa, Susono (JP); Toru Takashima, Susono (JP); Tetsuya Morino, Susono (JP); Yoshio Kudo, Machida (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 322 days.

(21) Appl. No.: 16/176,459

(22) Filed: Oct. 31, 2018

(65) Prior Publication Data

US 2019/0202492 A1   Jul. 4, 2019

(30) Foreign Application Priority Data

Dec. 28, 2017   (JP) .............................. JP2017-253563

(51) Int. Cl.
   *B62D 5/00*   (2006.01)
   *B62D 5/04*   (2006.01)
   *B62D 6/00*   (2006.01)

(52) U.S. Cl.
   CPC ........... *B62D 5/006* (2013.01); *B62D 5/0421* (2013.01); *B62D 5/0484* (2013.01); *B62D 6/008* (2013.01)

(58) Field of Classification Search
   CPC .... B62D 5/006; B62D 5/0421; B62D 5/0484; B62D 6/008
   See application file for complete search history.

(56) References Cited

U.S. PATENT DOCUMENTS

| | | | |
|---|---|---|---|
| 7,628,245 B2* | 12/2009 | Osonoi | B62D 1/163 180/405 |
| 2004/0238258 A1* | 12/2004 | Ono | B62D 6/10 180/402 |
| 2006/0200289 A1* | 9/2006 | Chino | B62D 5/006 701/41 |

(Continued)

FOREIGN PATENT DOCUMENTS

| | | |
|---|---|---|
| JP | 2004-196044 A | 7/2004 |
| JP | 2005-7977 A | 1/2005 |

(Continued)

*Primary Examiner* — Behrang Badii
*Assistant Examiner* — Daniel L Greene
(74) *Attorney, Agent, or Firm* — Sughrue Mion, PLLC

(57) ABSTRACT

A steer-by-wire system includes a steering reaction torque generation device mechanically separated from a turning device for turning wheels and configured to apply a reaction torque to a steering wheel. The steering reaction torque generation device has a duplex configuration including a first system and a second system, each system including a reaction torque motor. When both systems are normal, a control device generates the reaction torque having a normal characteristic by controlling an operation of the reaction torque motor of at least one system. In a case of single failure where one of the systems fails, the control device generates the reaction torque having a first characteristic by controlling an operation of the reaction torque motor of another of the systems. The reaction torque having the first characteristic is different from the reaction torque having the normal characteristic with respect to a same steering angle.

9 Claims, 11 Drawing Sheets

(56) References Cited

U.S. PATENT DOCUMENTS

| | | | |
|---|---|---|---|
| 2007/0205041 A1* | 9/2007 | Nishizaki | B62D 5/0472 |
| | | | 180/446 |
| 2008/0203963 A1* | 8/2008 | Suzuki | B62D 5/0487 |
| | | | 318/799 |
| 2015/0360715 A1* | 12/2015 | Shimizu | F16D 27/00 |
| | | | 701/43 |
| 2016/0072416 A1* | 3/2016 | Hirotani | H02P 29/02 |
| | | | 318/400.02 |
| 2017/0151978 A1* | 6/2017 | Oya | B62D 5/046 |

FOREIGN PATENT DOCUMENTS

| | | |
|---|---|---|
| JP | 2006-44378 A | 2/2006 |
| JP | 2006-76413 A | 3/2006 |

\* cited by examiner

STEER-BY-WIRE SYSTEM

BACKGROUND

Technical Field

The present disclosure relates to a steer-by-wire system.

Background Art

A vehicle of a steer-by-wire type is known. In the case of the steer-by-wire type, a turning mechanism for turning a wheel is mechanically separated from a steering wheel. Instead, the turning mechanism is provided with an electric motor. Wheel turning is performed by driving the electric motor in response to an operation of the steering wheel. Meanwhile, a reaction torque motor (reaction torque actuator) is provided in order to give a feeling of steering to a driver. A reaction torque having a desired characteristic is applied to the steering wheel by controlling an operation of the reaction torque motor in response to the operation of the steering wheel.

Here, let us consider a case where the reaction torque motor fails. In the case where the reaction torque motor fails, the reaction torque that the driver feels decreases and thus it becomes hard for the driver to accurately control a steering angle. For example, the driver may excessively turn the steering wheel by more than intended. It is therefore preferable to equip a backup in preparation for the failure of the reaction torque motor.

Patent Literature 1 discloses a steer-by-wire system. The steer-by-wire system is provided with a backup means that mechanically connects the turning mechanism and the steering wheel in a case where system malfunction is detected. The backup means is activated also in a case where malfunction of the reaction torque motor for applying the reaction torque to the steering wheel is detected. During a period from the detection of the malfunction of the reaction torque motor to the activation of the backup means, a controller short-circuits between terminals of the reaction torque motor in order to secure a certain amount of the reaction torque.

Patent Literature 2 discloses a steer-by-wire system. The steer-by-wire system is provided with a reaction torque motor (reaction torque applying means) that applies the reaction torque to the steering wheel and a second reaction torque applying means that is activated in a case where the reaction torque motor fails. More specifically, the second reaction torque applying means is a rotary damper. In the case where the reaction torque motor fails, a certain amount of the reaction torque is applied to the steering wheel by the rotary damper.

List of Related Art

Patent Literature 1: Japanese Laid-Open Patent Publication No. 2006-044378 Patent Literature 2: Japanese Laid-Open Patent Publication No. 2004-196044

SUMMARY

As described above, the steer-by-wire system generates the reaction torque having a desired characteristic by controlling the operation of the reaction torque motor in response to the operation of the steering wheel. It is desirable to flexibly generate the reaction torque also in the case where the reaction torque motor fails, in terms of securing operability of the steering wheel.

However, according to the techniques disclosed in Patent Literature 1 and Patent Literature 2 described above, it is not possible to flexibly generate the reaction torque in the case where the reaction torque motor fails. As for Patent Literature 1, a certain amount of the reaction torque is merely secured by short-circuiting between the terminals of the reaction torque motor. As for Patent Literature 2, a certain amount of the reaction torque is merely secured by the rotary damper. In either case, a certain degree of "feeling of viscosity" is merely secured by a mechanism different from the operation control of the reaction torque motor. Since the operation of the reaction torque motor is not controlled, it is not possible to flexibly generate the reaction torque in response to the operation of the steering wheel.

An object of the present disclosure is to provide a steer-by-wire system that can flexibly generate a reaction torque applied to a steering wheel even in a case where a reaction torque motor fails.

A first disclosure is directed to a steer-by-wire system mounted on a vehicle.

The steer-by-wire system includes:
a turning device configured to turn a wheel of the vehicle;
a steering reaction torque generation device mechanically separated from the turning device and configured to apply a reaction torque to a steering wheel; and
a control device configured to control the reaction torque by controlling an operation of the steering reaction torque generation device in response to an operation of the steering wheel.

The steering reaction torque generation device has a duplex configuration including a first system and a second system, each of the first system and the second system including a reaction torque motor.

In a case where both the first system and the second system are normal, the control device generates the reaction torque having a normal characteristic by controlling an operation of the reaction torque motor of at least one of the first system and the second system.

In a case of single failure where one of the first system and the second system fails, the control device generates the reaction torque having a first characteristic by controlling an operation of the reaction torque motor of another of the first system and the second system.

The reaction torque having the first characteristic is different from the reaction torque having the normal characteristic with respect to a same steering angle.

A second disclosure further has the following feature in addition to the first disclosure.

Each of the normal characteristic and the first characteristic has a tendency that the reaction torque increases as a steering angle increases.

A third disclosure further has the following feature in addition to the first or second disclosure.

A second characteristic is a characteristic of the reaction torque in a case of double failure where both the first system and the second system fail.

The first characteristic is an intermediate characteristic between the normal characteristic and the second characteristic.

A fourth disclosure further has the following feature in addition to the first or second disclosure.

A second characteristic is a characteristic of the reaction torque in a case of double failure where both the first system and the second system fail.

A first steering angle range is a range of the steering angle from 0 to a predetermined value.

A second steering angle range is a range of the steering angle larger than the predetermined value.

The reaction torque having the first characteristic in the first steering angle range is larger than the reaction torque having the normal characteristic with respect to a same steering angle and smaller than the reaction torque having the second characteristic with respect to a same steering angle.

The reaction torque having the first characteristic in the second steering angle range is smaller than the reaction torque having the normal characteristic with respect to a same steering angle and larger than the reaction torque having the second characteristic with respect to a same steering angle.

A fifth disclosure further has the following feature in addition to the first or second disclosure.

The reaction torque having the first characteristic is smaller than the reaction torque having the normal characteristic with respect to a same steering angle.

A sixth disclosure further has the following feature in addition to the first or second disclosure.

The reaction torque having the first characteristic is larger than the reaction torque having the normal characteristic with respect to a same steering angle.

A seventh disclosure further has the following feature in addition to the fourth or sixth disclosure.

When the single failure occurs, the control device increases or decreases responsiveness of current control of the reaction torque motor.

An eighth disclosure further has the following feature in addition to any one of the first to seventh disclosures.

When controlling the operation of the reaction torque motor to generate the reaction torque, the control device performs torque ripple suppression control to suppress torque ripple.

The control device sets a control gain of the torque ripple suppression control in the case of the single failure to be lower than in the case where both the first system and the second system are normal.

A ninth disclosure further has the following feature in addition to any one of the first to eighth disclosures.

The control device changes a characteristic of the reaction torque from the normal characteristic to the first characteristic in a period when a driver of the vehicle does not operate the steering wheel after the single failure occurs.

According to the first disclosure, the steering reaction torque generation device for applying the reaction torque to the steering wheel is "duplicated". Therefore, even in the case where the single failure occurs, it is possible to keep applying the reaction torque by using a normal one of the first system and the second system. This contributes to increase in confidence in the steer-by-wire system.

Furthermore, according to the first disclosure, the first system and the second system each generates the reaction torque by the same mechanism. More specifically, each of the first system and the second system includes the reaction torque motor and generates the reaction torque by an operation of the reaction torque motor. The control device can flexibly generate the reaction torque having a desired characteristic by controlling the operation of the reaction torque motor in response to the operation of the steering wheel. Even in the case where the single failure occurs, the control device can flexibly generate the reaction torque having a desired characteristic by controlling the operation of the reaction torque motor of a normal one of the first system and the second system.

For example, the control device can make the reaction torque having the first characteristic in the case of the single failure be different from the reaction torque having the normal characteristic with respect to the same steering angle. In other words, the control device is able to "actively" change the magnitude of the reaction torque having the first characteristic in the case of the single failure from the normal characteristic. As a result, it becomes easier for a driver to recognize that "the single failure has occurred".

According to the second disclosure, not only the normal characteristic but also the first characteristic has the tendency that the reaction torque increases as the steering angle increases. As a result, a moderate feeling of buildup (i.e. a feeling that a resistance increases as the steering angle increases) is reproduced even in the case of the single failure. Since the feeling of buildup is reproduced, it becomes easier for the driver to accurately control a steering angle. That is, good operability of the steering wheel is secured.

According to the third and fourth disclosures, the first characteristic in the case of the single failure is set to be an intermediate characteristic between the normal characteristic and the second characteristic in the case of the double failure. In other words, the first characteristic is set to be closer to the second characteristic as seen from the normal characteristic. Therefore, even if the double failure occurs, a variation amount of the reaction torque at the time is suppressed. Since the variation amount of the reaction torque is suppressed, it becomes easier for the driver to adapt to the variation of the reaction torque.

According to the fifth disclosure, the reaction torque having the first characteristic is smaller than the reaction torque having the normal characteristic with respect to the same steering angle. As a result, it becomes easier for the driver to recognize that "the single failure has occurred".

According to the sixth disclosure, the reaction torque having the first characteristic is larger than the reaction torque having the normal characteristic with respect to the same steering angle. As a result, it becomes easier for the driver to recognize that "the single failure has occurred".

According to the seventh disclosure, when the single failure occurs, the responsiveness of the current control of the reaction torque motor increases or decreases. As a result, it becomes easier to realize a steep rise in the reaction torque having the first characteristic in the first steering angle range.

According to the eighth disclosure, the control gain of the torque ripple suppression control in the case of the single failure is lower than in the case of a normal operation. Accordingly, an amplitude of the torque ripple increases and thus the driver feels the torque ripple more clearly. As a result, it becomes easier for the driver to recognize the occurrence of the single failure.

According to the ninth disclosure, it is possible to prevent the characteristic of the reaction torque from being changed abruptly in the period when the driver operates the steering wheel.

EMBODIMENTS

Embodiments of the present disclosure will be described below with reference to the attached drawings.

1. Basic Configuration of Steer-by-Wire System

Figure 1:
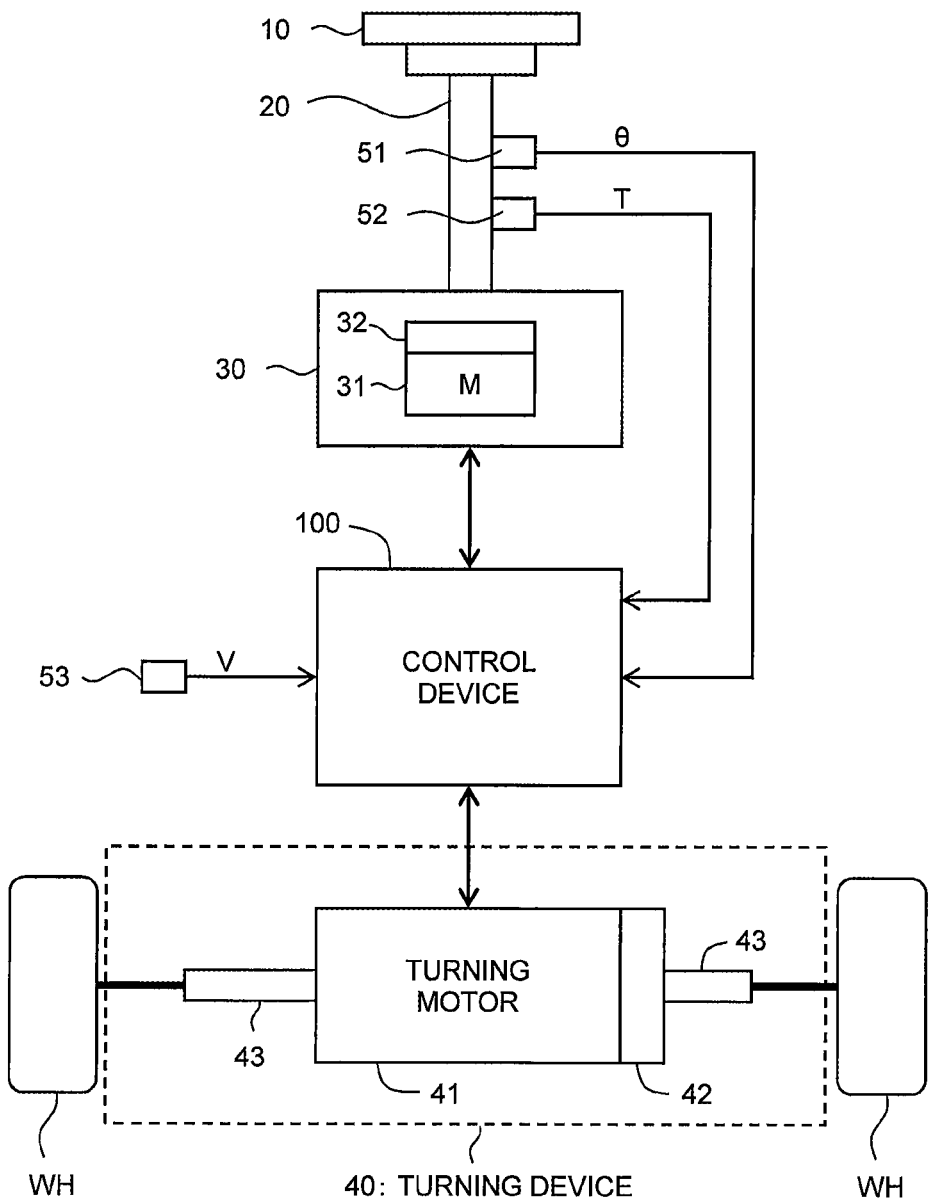
FIG. 1 is a block diagram schematically showing a configuration example of a steer-by-wire system according to an embodiment of the present disclosure.

FIG. 1 is a block diagram schematically showing a configuration example of a steer-by-wire system 1 according to the present embodiment. The steer-by-wire system 1 is mounted on a vehicle and turns a wheel WH of the vehicle by a steer-by-wire manner. More specifically, the steer-by-wire system 1 includes a steering wheel 10, a steering shaft 20, a steering reaction torque generation device 30, a turning device 40, a sensor group (51 to 53), and a control device 100.

The steering wheel 10 is an operation member that a driver of the vehicle uses for steering. The steering shaft 20 is coupled with the steering wheel 10 and rotates together with the steering wheel 10.

The steering reaction torque generation device 30 applies a reaction torque TR to the steering wheel 10 in a pseudo manner. More specifically, the steering reaction torque generation device 30 includes a reaction torque motor 31 (reaction torque actuator). A rotor of the reaction torque motor 31 is connected to the steering shaft 20 through a speed reducer 32. Actuating the reaction torque motor 31 makes it possible to apply the reaction torque TR to the steering shaft 20 and thus the steering wheel 10. An operation of the steering reaction torque generation device 30 is controlled by the control device 100.

The turning device 40 turns the wheel WH. The turning device 40 includes a turning motor 41, a speed reducer 42, and a turning bar 43. A rotor or the turning motor 41 is connected to the turning bar 43 through a speed reducer 42. The turning bar 43 is coupled with the wheel WH. When the turning motor 41 rotates, its rotational motion is converted into a linear motion of the turning bar 43, and thereby the wheel WH turns. That is, actuating the turning motor 41 makes it possible to turn the wheel WH. An operation of the turning motor 41 is controlled by the control device 100.

It should be noted that the steering reaction torque generation device 30 and the turning device 40 are mechanically separated from each other.

A steering angle sensor 51 detects a steering angle θ of the steering wheel 10. The steering angle sensor 51 transmits information of the detected steering angle θ to the control device 100.

A steering torque sensor 52 detects a steering torque T applied to the steering shaft 20. The steering torque sensor 52 transmits information of the detected steering torque T to the control device 100.

A vehicle speed sensor 53 detects a vehicle speed V being a speed of the vehicle. The vehicle speed sensor 53 transmits information of the detected vehicle speed V to the control device 100. It should be noted that a wheel speed sensor may be used instead of the vehicle speed sensor 53 to calculate the vehicle speed V from a rotational speed of each wheel.

The control device 100 controls the steer-by-wire system 1 according to the present embodiment. The control device 100 includes a microcomputer provided with a processor, a memory, and an input/output interface. The microcomputer is also called an ECU (Electronic Control Unit).

More specifically, the control device 100 controls turning of the wheel WH by controlling the operation of the turning motor 41 of the turning device 40 in response to the driver's operation of the steering wheel 10. For example, the control device 100 calculates a target turn angle based on the steering angle θ, the vehicle speed V, and so forth. Based on the target turn angle and a rotation angle of the turning motor 41, the control device 100 generates a current control signal for driving the turning motor 41. The turning motor 41 is driven according to the current control signal, and the wheel WH is turned by the rotation of the turning motor 41.

Furthermore, the control device 100 controls the reaction torque TR applied to the steering wheel 10 by controlling the operation of the reaction torque motor 31 of the steering reaction torque generation device 30 in response to the driver's operation of the steering wheel 10. For example, the control device 100 calculates a target reaction torque based on the steering angle θ, the vehicle speed V, and so forth. Then, the control device 100 performs drive control of the reaction torque motor 31 such that the target reaction torque is generated. For example, the control device 100 generates a current control signal for driving the reaction torque motor 31, based on the target reaction torque, a rotation angle of the reaction torque motor 31, the steering torque T, and so forth. The reaction torque motor 31 is driven according to the current control signal, and thereby the reaction torque TR is generated.

2. Duplex Configuration of Steering Reaction Torque Generation Device

Next, a configuration of the steering reaction torque generation device 30 according to the present embodiment will be described in more detail. In a case where the steering reaction torque generation device 30 fails, the reaction torque TR that the driver feels decreases and thus it becomes hard for the driver to accurately control the steering angle θ. For example, the driver may excessively turn the steering wheel 10 by more than intended. In view of the above, according to the present embodiment, the steering reaction torque generation device 30 is "duplicated".

Figure 2:
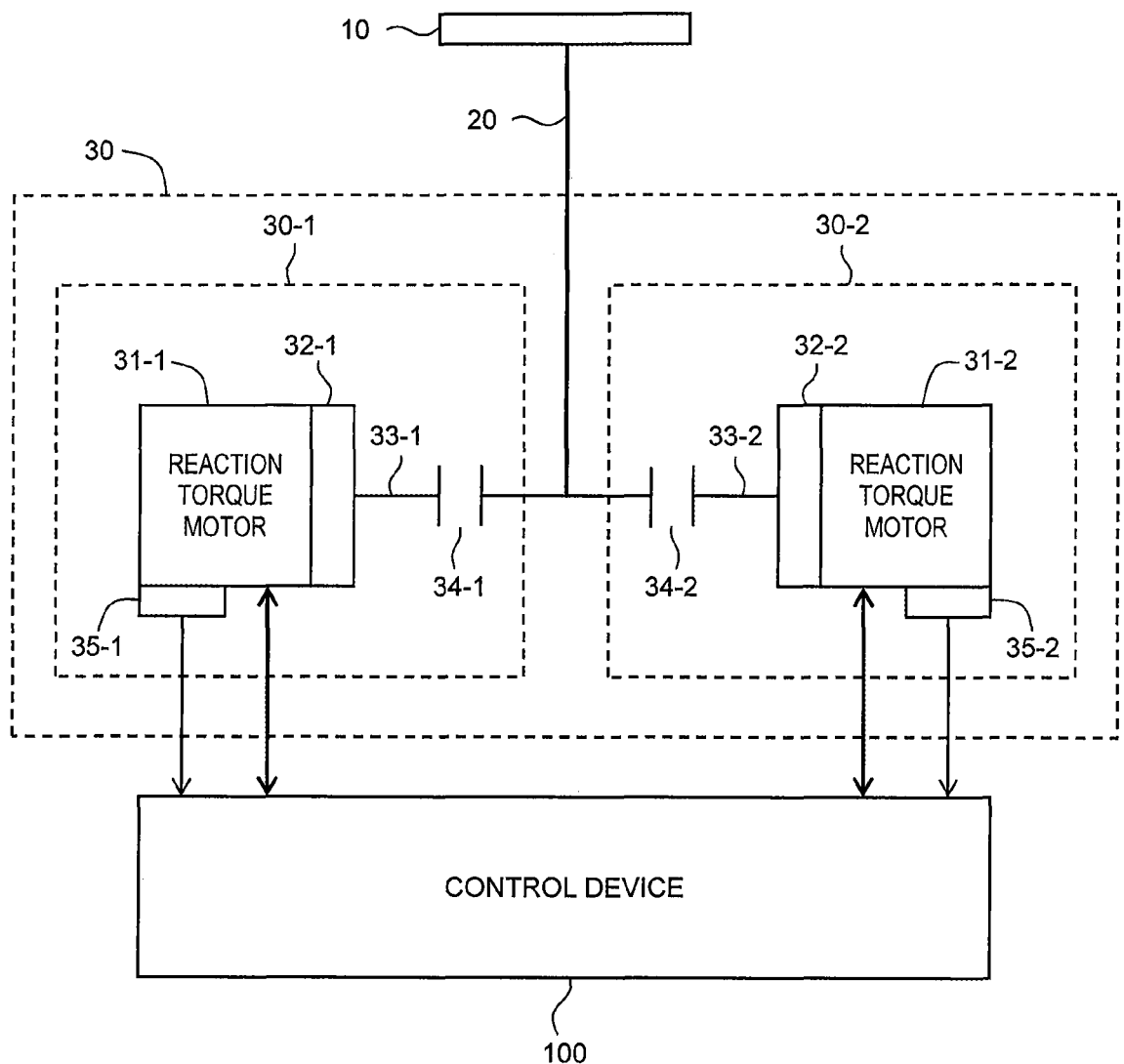
FIG. 2 is a conceptual diagram showing a duplex configuration of a steering reaction torque generation device of the steer-by-wire system according to the embodiment of the present disclosure.

FIG. 2 is a conceptual diagram showing a duplex configuration of the steering reaction torque generation device 30. As shown in FIG. 2, the steering reaction torque generation device 30 includes a first system 30-1 and a second system 30-2 that are independent of each other. The first system 30-1 and the second system 30-2 have the same configuration and are capable of generating the reaction torques TR by the same mechanism.

More specifically, the first system 30-1 includes a reaction torque motor 31-1 and a speed reducer 32-1. A rotor of the reaction torque motor 31-1 is connected to an output shaft 33-1 through a speed reducer 32-1. The output shaft 33-1 is connected to the steering shaft 20 through a transmission mechanism 34-1 such as gears. Actuating the reaction torque motor 31-1 makes it possible to apply the reaction torque TR to the steering shaft 20 and thus the steering wheel 10. An operation of the reaction torque motor 31-1 is controlled by the control device 100.

Furthermore, the control device 100 is able to recognize a failure (malfunction) of the first system 30-1. Typically, the failure of the first system 30-1 is a failure of the reaction torque motor 31-1 such as being unable to generate a desired reaction torque TR. For example, the control device 100 can detect the failure of the reaction torque motor 31-1 based on a response of the reaction torque motor 31-1 to the current control signal. As another example, a malfunction detection sensor 35-1 that detects the failure of the first system 30-1 may be provided separately. In this case, the control device 100 can recognize the failure of the first system 30-1 based on an output from the malfunction detection sensor 35-1.

Similarly, the second system 30-2 includes a reaction torque motor 31-2 and a speed reducer 32-2. A rotor of the reaction torque motor 31-2 is connected to an output shaft 33-2 through a speed reducer 32-2. The output shaft 33-2 is connected to the steering shaft 20 through a transmission mechanism 34-2 such as gears. Actuating the reaction torque motor 31-2 makes it possible to apply the reaction torque TR to the steering shaft 20 and thus the steering wheel 10. An operation of the reaction torque motor 31-2 is controlled by the control device 100.

Furthermore, the control device 100 is able to recognize a failure (malfunction) of the second system 30-2. Typically, the failure of the second system 30-2 is a failure of the reaction torque motor 31-2 such as being unable to generate a desired reaction torque TR. For example, the control device 100 can detect the failure of the reaction torque motor 31-2 based on a response of the reaction torque motor 31-2 to the current control signal. As another example, a malfunction detection sensor 35-2 that detects the failure of the second system 30-2 may be provided separately. In this case, the control device 100 can recognize the failure of the second system 30-2 based on an output from the malfunction detection sensor 35-2.

3. Reaction Torque Control by Control Device

Hereinafter, the reaction torque control by the control device 100 according to the present embodiment will be described in detail. The control device 100 controls the reaction torque TR by controlling the operation of the reaction torque motor 31 of the steering reaction torque generation device 30 in response to the driver's operation of the steering wheel 10.

Figure 3:
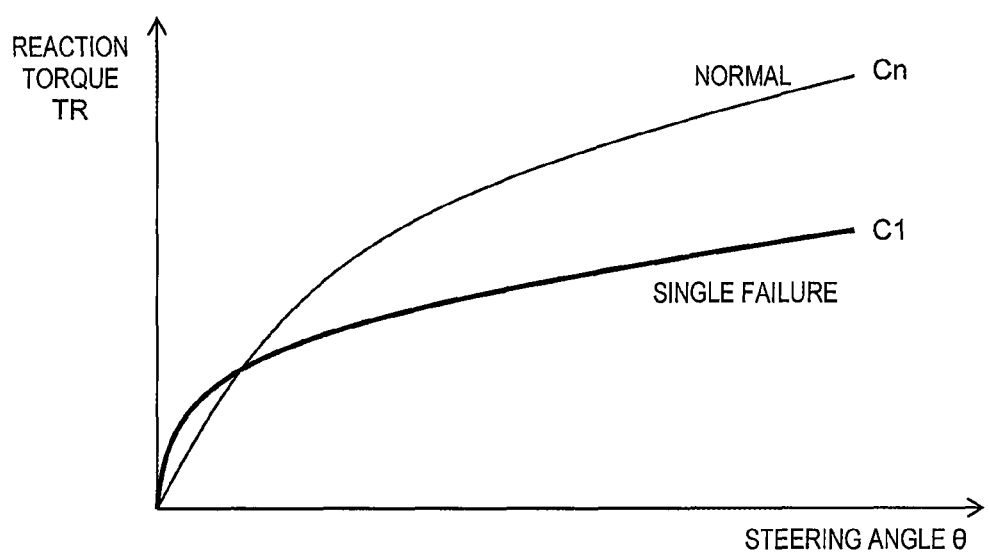
FIG. 3 is a conceptual diagram for explaining reaction torque control in the steer-by-wire system according to the embodiment of the present disclosure.

FIG. 3 is a conceptual diagram for explaining the reaction torque control according to the present embodiment. A horizontal axis represents the steering angle θ of the steering wheel 10, and a vertical axis represents the reaction torque TR generated by the steering reaction torque generation device 30. A reaction torque characteristic being a characteristic of the reaction torque TR is represented by a relationship between the steering angle θ and the reaction torque TR. The reaction torque characteristic is not fixed but adjustable through control of the operation of the reaction torque motor 31 by the control device 100.

First, let us consider a case where both the first system 30-1 and the second system 30-2 are normal (i.e. not faulty). In this case, the control device 100 generates the reaction torque TR having a normal characteristic Cn by controlling the operation of the reaction torque motor 31 of at least one of the first system 30-1 and the second system 30-2. As shown in FIG. 3, the normal characteristic Cn has a tendency that the reaction torque TR increases as the steering angle θ increases. Due to the reaction torque TR having such the normal characteristic Cn, a moderate feeling of buildup (i.e. a feeling that a resistance increases as the steering angle θ increases) is reproduced. Since the feeling of buildup is reproduced, it becomes easier for the driver to accurately control the steering angle θ. That is, good operability of the steering wheel 10 is secured.

Next, let us consider a case of "single failure (single fault)" where one of the first system 30-1 and the second system 30-2 fails. In the case of the single failure, the control device 100 generates the reaction torque TR having a first characteristic C1 by controlling the operation of the reaction torque motor 31 of another (normal one) of the first system 30-1 and the second system 30-2. The first characteristic C1 has a tendency that the reaction torque TR increases as the steering angle θ increases, as in the case of the normal characteristic Cn. As a result, a moderate feeling of buildup is reproduced even in the case of the single failure. Thus, good operability of the steering wheel 10 is secured.

It should be noted that, as shown in FIG. 3, the reaction torque TR having the first characteristic C1 is different from the reaction torque TR having the normal characteristic Cn with respect to the same steering angle θ. That is, the control device 100 "actively" changes a magnitude of the reaction torque TR having the first characteristic C1 from the normal characteristic Cn. Since the first characteristic C1 in the case of the single failure changes from the normal characteristic Cn, it becomes easier for the driver to recognize that "the single failure has occurred".

Figure 4:
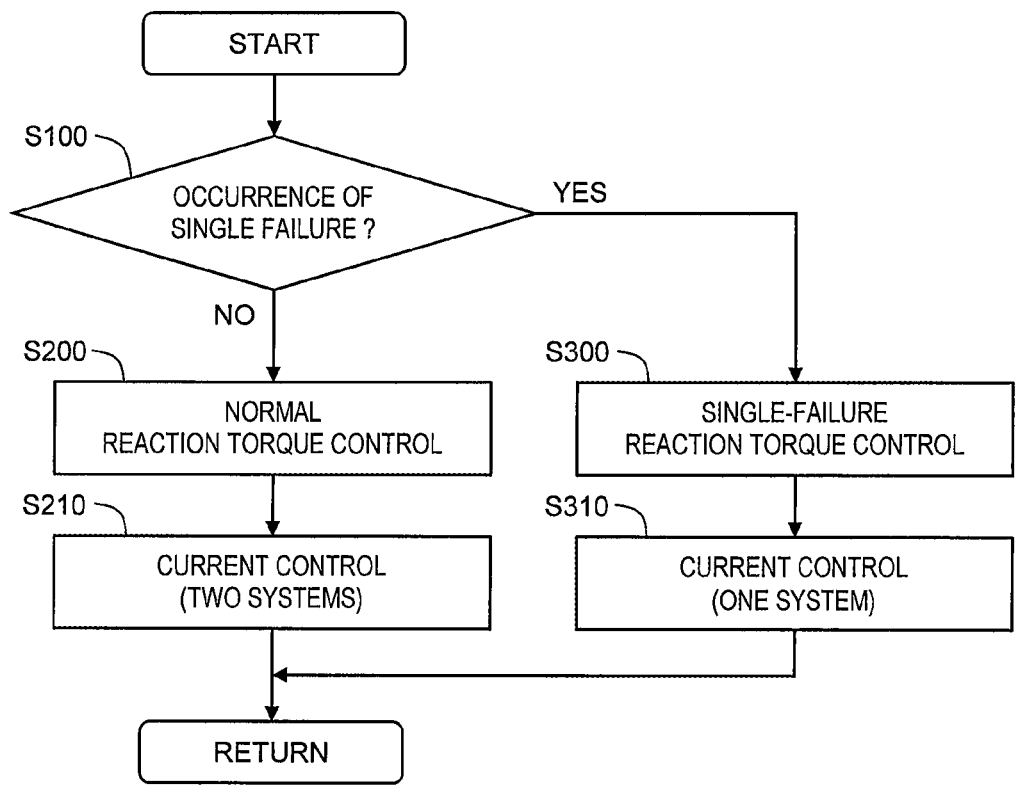
FIG. 4 is a flow chart showing in a summarized manner the reaction torque control in the steer-by-wire system according to the embodiment of the present disclosure.

FIG. 4 is a flow chart showing in a summarized manner the reaction torque control according to the present embodiment. In Step S100, the control device 100 determines whether or not the single failure occurs. When the single failure has not occurred (Step S100; No), the processing proceeds to Step S200. On the other hand, when the single failure occurs (Step S100; Yes), the processing proceeds to Step S300.

In Step S200, the control device 100 performs normal reaction torque control. More specifically, the control device 100 calculates a target reaction torque having the normal characteristic Cn, based on the steering angle θ, the vehicle speed V, and so forth. Then, the control device 100 performs the current control of the reaction torque motor 31 of at least one of the first system 30-1 and the second system 30-2 such that the target reaction torque is obtained (Step S210).

In Step S300, on the other hand, the control device 100 performs single-failure reaction torque control. More specifically, the control device 100 calculates a target reaction torque having the first characteristic C1, based on the steering angle θ, the vehicle speed V, and so forth. Then, the control device 100 performs the current control of the reaction torque motor 31 of the normal one of the first system 30-1 and the second system 30-2 such that the target reaction torque is obtained (Step S310).

According to the steer-by-wire system 1 of the present embodiment, as described above, the steering reaction torque generation device 30 for applying the reaction torque TR to the steering wheel 10 is "duplicated". Therefore, even in the case where the single failure occurs, it is possible to keep applying the reaction torque TR by using a normal one of the first system 30-1 and the second system 30-2. This contributes to increase in confidence in the steer-by-wire system 1.

Furthermore, according to the present embodiment, the first system 30-1 and the second system 30-2 each generates the reaction torque TR by the same mechanism. More specifically, each of the first system 30-1 and the second system 30-2 includes the reaction torque motor 31 and generates the reaction torque TR by the operation of the reaction torque motor 31. The control device 100 can flexibly generate the reaction torque TR having a desired characteristic by controlling the operation of the reaction torque motor 31 in response to the operation of the steering wheel 10. Even in the case where the single failure occurs, the control device 100 can flexibly generate the reaction torque TR having a desired characteristic by controlling the operation of the reaction torque motor 31 of a normal one of the first system 30-1 and the second system 30-2.

For example, the control device 100 can make the reaction torque TR having the first characteristic C1 in the case of the single failure be different from the reaction torque TR having the normal characteristic Cn with respect to the same steering angle θ. In other words, the control device 100 is able to "actively" change the magnitude of the reaction torque TR having the first characteristic C1 in the case of the single failure from the normal characteristic Cn. As a result, it becomes easier for the driver to recognize that "the single failure has occurred".

Moreover, the control device 100 can make the first characteristic C1 in the case of the single failure have a steering angle dependency similar to that of the normal characteristic Cn. More specifically, the normal characteristic Cn has the tendency that the reaction torque TR increases as the steering angle θ increases. The control device 100 can set the first characteristic C1 so as to have the same tendency as the normal characteristic Cn. As a result, a moderate feeling of buildup (i.e. a feeling that a resistance increases as the steering angle θ increases) is reproduced even in the case of the single failure. Since the feeling of buildup is reproduced, it becomes easier for the driver to accurately control the steering angle θ. That is, good operability of the steering wheel 10 is secured.

Here, let us consider, as a comparative example, the techniques disclosed in Patent Literature 1 and Patent Literature 2 described above. In the comparative example, the reaction torque motor is not duplicated. In the case where the reaction torque motor fails, the reaction torque is generated by a mechanism different from the operation control of the reaction torque motor. As for Patent Literature 1, a certain amount of the reaction torque is merely secured by short-circuiting between the terminals of the reaction torque motor. As for Patent Literature 2, a certain amount of the reaction torque is merely secured by the rotary damper. In either case, a certain degree of "feeling of viscosity" is merely secured by a mechanism different from the operation control of the reaction torque motor. Since the operation of the reaction torque motor is not controlled, it is not possible to flexibly generate the reaction torque in response to the operation of the steering wheel.

4. Various Setting Examples of First Characteristic

Various setting examples can be considered for the first characteristic C1 in the case of the single failure. Hereinafter, various setting examples of the first characteristic C1 will be described.

4-1. First Setting Example

Figure 5:
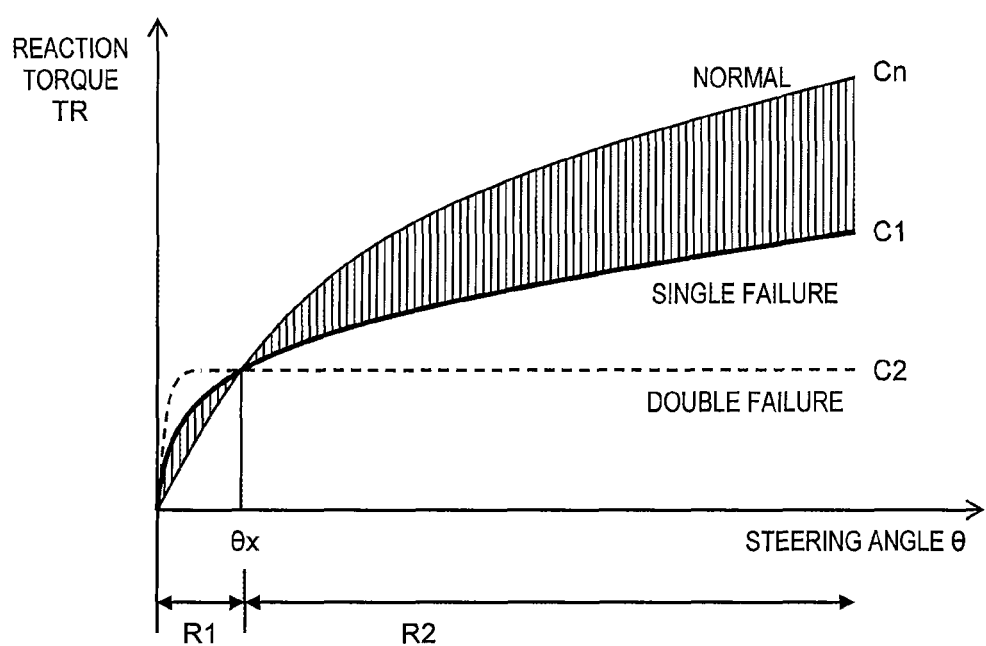
FIG. 5 is a conceptual diagram for explaining a first setting example of a reaction torque characteristic (first characteristic) in a case of single failure of the steering reaction torque generation device according to the embodiment of the present disclosure.

FIG. 5 is a conceptual diagram for explaining a first setting example of the first characteristic C1. A horizontal axis represents the steering angle θ of the steering wheel 10, and a vertical axis represents the reaction torque TR. A second characteristic C2 also is shown in FIG. 5 in addition to the normal characteristic Cn and the first characteristic C1.

The second characteristic C2 is a characteristic of the reaction torque TR in a case of "double failure (double fault)" where both the first system 30-1 and the second system 30-2 fail. In the case of the double failure, it is not possible to control the operation of the reaction torque motor 31 to flexibly generate the reaction torque TR. A main component of the second characteristic C2 is mechanical friction caused by the speed reducer 32 and the like. As shown in FIG. 5, the reaction torque TR in the case of the second characteristic C2 is almost constant regardless of the steering angle θ.

In FIG. 5, a line representing the normal characteristic Cn and another line representing the second characteristic C2 intersect at a point where the steering angle θ is equal to a predetermined value θx. A first steering angle range R1 is a range of the steering angle θ from 0 (neutral) to the predetermined value θx. A second steering angle range R2 is a range of the steering angle θ larger than the predetermined value θx. In the first steering angle range R1, the reaction torque TR having the second characteristic C2 is larger than the reaction torque TR having the normal characteristic Cn with respect to the same steering angle θ (i.e. C2>Cn). On the other hand, in the second steering angle range R2, the reaction torque TR having the second characteristic C2 is smaller than the reaction torque TR having the normal characteristic Cn with respect to the same steering angle θ (i.e. C2<Cn).

According to the first setting example, the first characteristic C1 is set to be an intermediate characteristic between the normal characteristic Cn and the second characteristic C2. That is, in the first steering angle range R1, the reaction torque TR having the first characteristic C1 is larger than the reaction torque TR having the normal characteristic Cn with respect to the same steering angle θ and smaller than the reaction torque TR having the second characteristic C2 with respect to the same steering angle θ (i.e. C2>C1>Cn). On the other hand, in the second steering angle range R2, the reaction torque TR having the first characteristic C1 is smaller than the reaction torque TR having the normal characteristic Cn with respect to the same steering angle θ and larger than the reaction torque TR having the second characteristic C2 with respect to the same steering angle θ (i.e. C2<C1<Cn).

Figure 6:
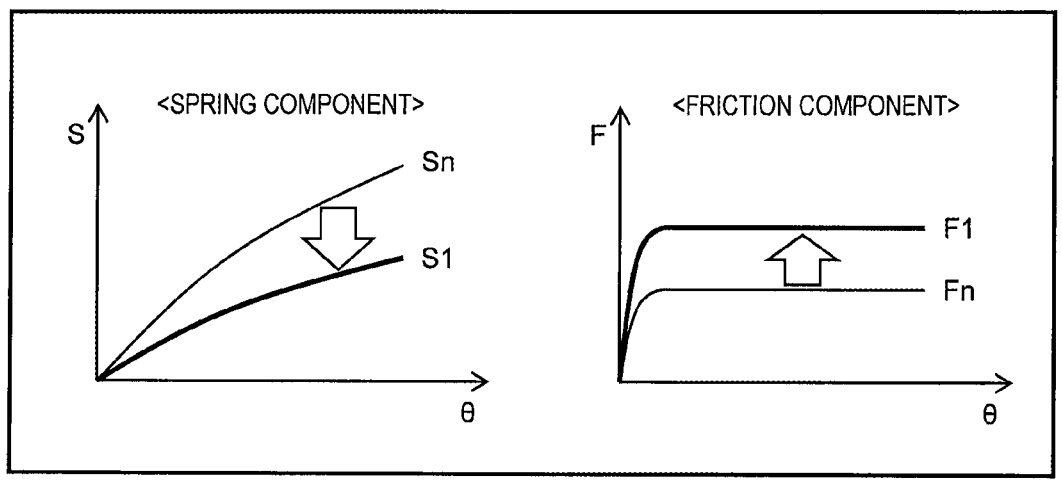
FIG. 6 is a conceptual diagram for explaining the first setting example of the reaction torque characteristic (first characteristic) in the case of the single failure of the steering reaction torque generation device according to the embodiment of the present disclosure.

FIG. 6 shows an example for realizing the first characteristic C1 shown in FIG. 5. The reaction torque TR generated by the control device 100 controlling the operation of the reaction torque motor 31 is represented by a sum of a spring component S and a friction component F (i.e. TR=S+F). The spring component S increases as the steering angle θ increases. On the other hand, the friction component F is almost constant regardless of the steering angle θ. The control device 100 decreases the spring component S1 of the first characteristic C1 to be smaller than the spring component Sn of the normal characteristic Cn and increases the friction component F1 of the first characteristic C1 to be larger than the friction component Fn of the normal characteristic Cn. In this manner, the first characteristic C1 as shown in FIG. 5 can be realized.

As shown in FIG. 5, a rise gradient of the reaction torque TR having the first characteristic C1 in the first steering angle range R1 is higher than that of the normal characteristic Cn. If responsiveness of the current control of the reaction torque motor 31 (Step S310 in FIG. 4) is low, it is hard to realize such the steep rise. Therefore, when the single failure occurs, the control device 100 may increase the responsiveness of the current control of the reaction torque motor 31. For example, increasing a feedback gain in the current control can increase the responsiveness. As a result of the increase in the responsiveness, it becomes easier to realize the steep rise in the first characteristic C1 in the first steering angle range R1.

Alternatively, the control device 100 may decrease the responsiveness of the current control of the reaction torque motor 31, when the single failure occurs. When the responsiveness of the current control decreases, it becomes easy for the driver to feel the mechanical friction caused by the speed reducer 32 and the like, that is, the second characteristic C2. As a result, the rise gradient of the reaction torque TR having the first characteristic C1 in the first steering angle range R1 becomes higher.

According to the first setting example described above, the reaction torque TR having the first characteristic C1 is different from the reaction torque TR having the normal characteristic Cn with respect to the same steering angle θ. As a result, it becomes easier for the driver to recognize that "the single failure has occurred". Moreover, the first characteristic C1 has a steering angle dependency similar to that of the normal characteristic Cn. As a result, a moderate feeling of buildup is reproduced even in the case of the single failure. Thus, good operability of the steering wheel 10 is secured.

Furthermore, according to the first setting example, the first characteristic C1 is set to be an intermediate characteristic between the normal characteristic Cn and the second characteristic C2. In other words, the first characteristic C1 is set to be closer to the second characteristic C2 as seen from the normal characteristic Cn. Therefore, even if the double failure occurs, a variation amount of the reaction torque TR at the time is suppressed. Since the variation amount of the reaction torque TR is suppressed, it becomes easier for the driver to adapt to the variation of the reaction torque TR.

4-2. Second Setting Example

Figure 7:
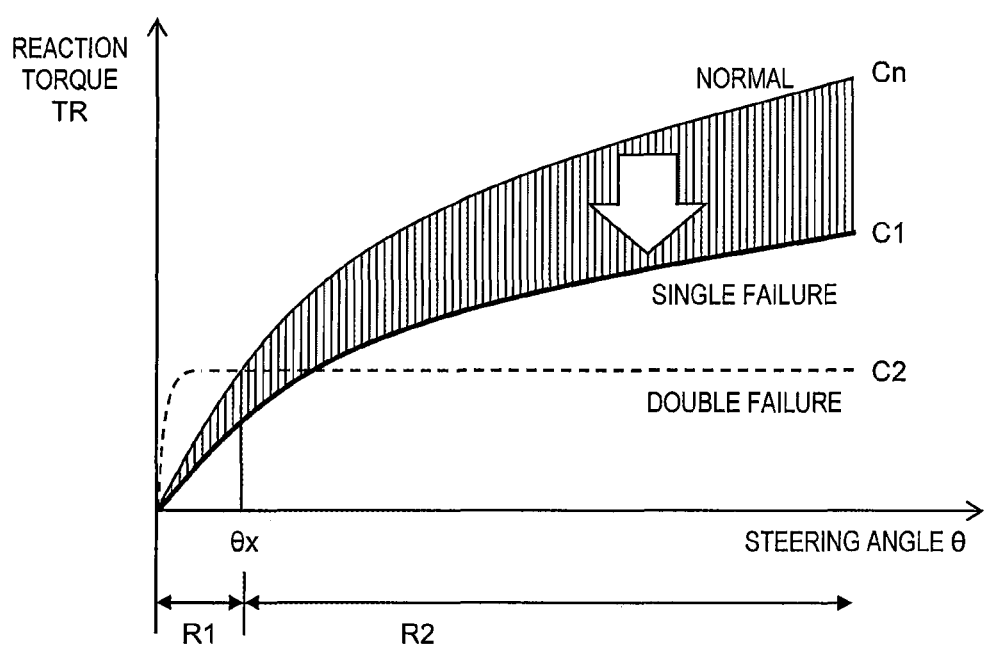
FIG. 7 is a conceptual diagram for explaining a second setting example of the reaction torque characteristic (first characteristic) in the case of the single failure of the steering reaction torque generation device according to the embodiment of the present disclosure.

FIG. 7 is a conceptual diagram for explaining a second setting example of the first characteristic C1. Descriptions overlapping with the first setting example will be omitted as appropriate.

According to the second setting example, the reaction torque TR having the first characteristic C1 is wholly weaker than the the reaction torque TR having the normal characteristic Cn. That is, the reaction torque TR having the first characteristic C1 in the whole steering angle range is smaller than the reaction torque TR having the normal characteristic Cn with respect to the same steering angle θ.

Figure 8:
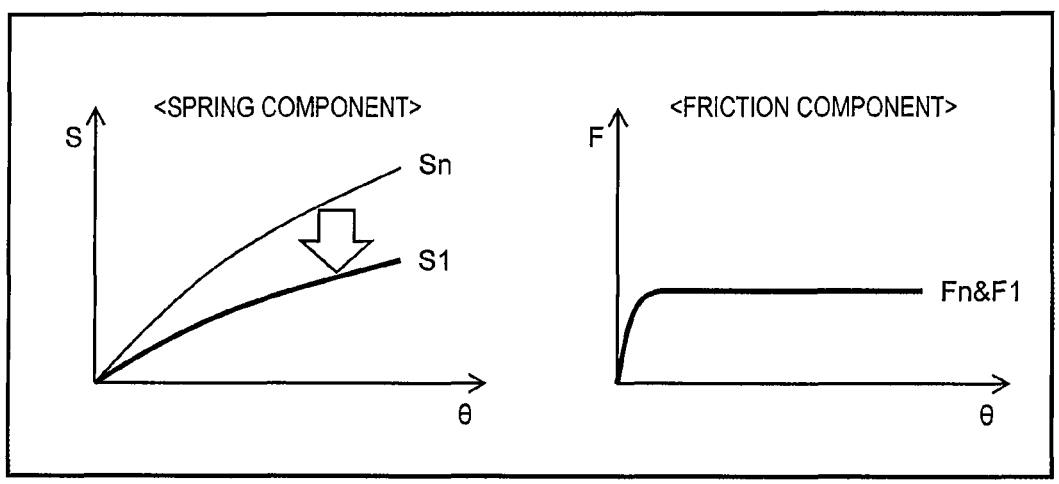
FIG. 8 is a conceptual diagram for explaining the second setting example of the reaction torque characteristic (first characteristic) in the case of the single failure of the steering reaction torque generation device according to the embodiment of the present disclosure.

FIG. 8 shows an example for realizing the first characteristic C1 shown in FIG. 7. The control device 100 decreases the spring component S1 of the first characteristic C1 to be smaller than the spring component Sn of the normal characteristic Cn and sets the friction component F1 of the first characteristic C1 to be the same as the friction component Fn of the normal characteristic Cn. In this manner, the first characteristic C1 as shown in FIG. 7 can be realized.

According to the second setting example described above, the reaction torque TR having the first characteristic C1 is smaller than the reaction torque TR having the normal characteristic Cn with respect to the same steering angle θ. As a result, it becomes easier for the driver to recognize that "the single failure has occurred". Moreover, the first characteristic C1 has a steering angle dependency similar to that of the normal characteristic Cn. As a result, a moderate feeling of buildup is reproduced even in the case of the single failure. Thus, good operability of the steering wheel 10 is secured.

4-3. Third Setting Example

Figure 9:
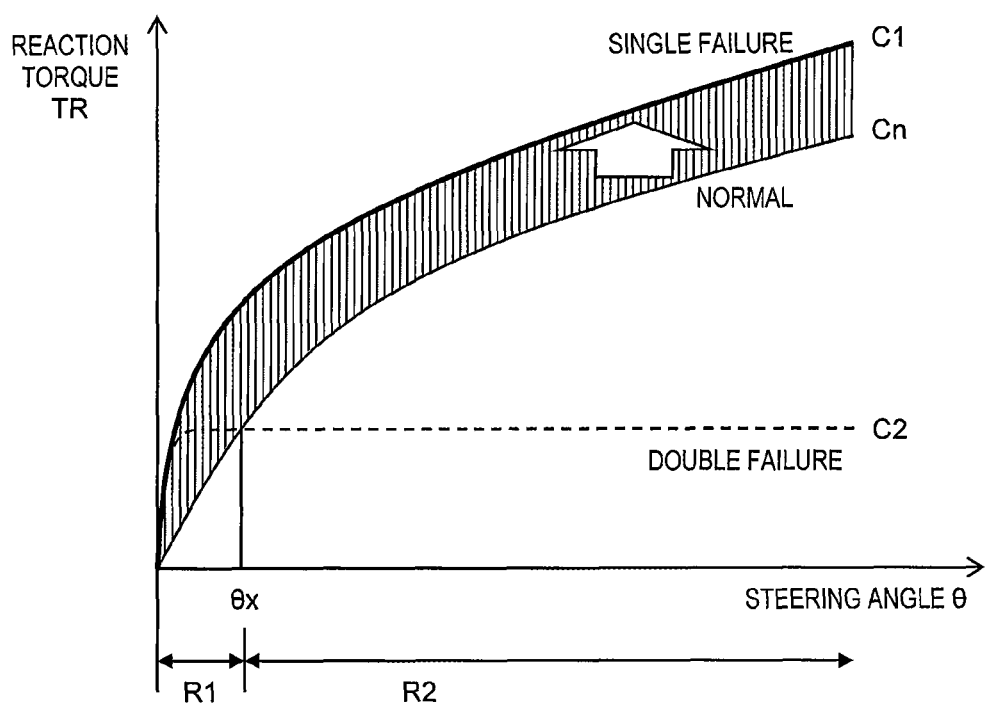
FIG. 9 is a conceptual diagram for explaining a third setting example of the reaction torque characteristic (first characteristic) in the case of the single failure of the steering reaction torque generation device according to the embodiment of the present disclosure.

FIG. 9 is a conceptual diagram for explaining a third setting example of the first characteristic C1. Descriptions overlapping with the first setting example will be omitted as appropriate.

According to the third setting example, the reaction torque TR having the first characteristic C1 is wholly stronger than the the reaction torque TR having the normal characteristic Cn. That is, the reaction torque TR having the first characteristic C1 in the whole steering angle range is larger than the reaction torque TR having the normal characteristic Cn with respect to the same steering angle θ.

Figure 10:
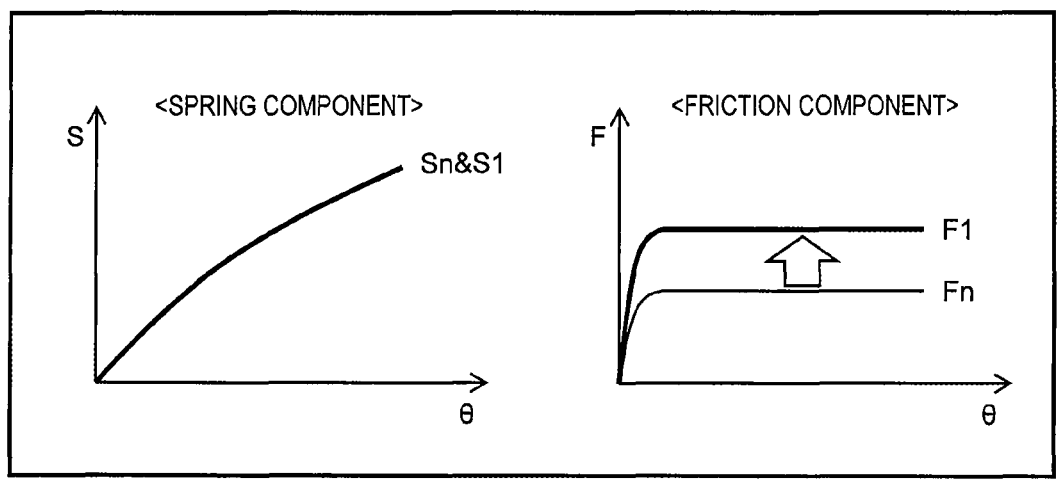
FIG. 10 is a conceptual diagram for explaining the third setting example of the reaction torque characteristic (first characteristic) in the case of the single failure of the steering reaction torque generation device according to the embodiment of the present disclosure.

FIG. 10 shows an example for realizing the first characteristic C1 shown in FIG. 9. The control device 100 sets the spring component S1 of the first characteristic C1 to be the same as the spring component Sn of the normal characteristic Cn and increases the friction component F1 of the first characteristic C1 to be larger than the friction component Fn of the normal characteristic Cn. In this manner, the first characteristic C1 as shown in FIG. 9 can be realized.

When the single failure occurs, the control device 100 may increase or decrease the responsiveness of the current control of the reaction torque motor 31, as in the case of the first setting example. As a result of the increase in the responsiveness, it becomes easier to realize the steep rise in the first characteristic C1 in the first steering angle range R1.

According to the third setting example described above, the reaction torque TR having the first characteristic C1 is larger than the reaction torque TR having the normal characteristic Cn with respect to the same steering angle θ. As a result, it becomes easier for the driver to recognize that "the single failure has occurred". Moreover, the first characteristic C1 has a steering angle dependency similar to that of the normal characteristic Cn. As a result, a moderate feeling of buildup is reproduced even in the case of the single failure. Thus, good operability of the steering wheel 10 is secured.

5. Torque Ripple Suppression Control

There is a possibility that torque ripple caused by the speed reducer 32 is superposed on the reaction torque TR. When controlling the operation of the reaction torque motor 31 to generate the reaction torque TR, the control device 100 performs well-known torque ripple suppression control (e.g. steering torque differential control) in order to suppress (reduce) the torque ripple.

The control device 100 may set a control gain of the torque ripple suppression control in the case of the single failure to be lower than in the normal case. Accordingly, an amplitude of the torque ripple increases and thus the driver feels the torque ripple more clearly. As a result, it becomes easier for the driver to recognize the occurrence of the single failure. Moreover, by increasing the torque ripple when the single failure occurs, it is possible to reduce an amount of increase in the torque ripple when the double failure occurs.

6. Examples of Characteristic Change Timing

According to the present embodiment, as described above, the reaction torque characteristic changes from the normal characteristic Cn to the first characteristic C1 when the single failure occurs. Here, if the reaction torque characteristic changes abruptly, the driver may possibly have an excessive feeling of strangeness. In order to prevent the excessive feeling of strangeness, the control device 100 may gradually change the reaction torque characteristic from the normal characteristic Cn to the first characteristic C1.

Figure 11:
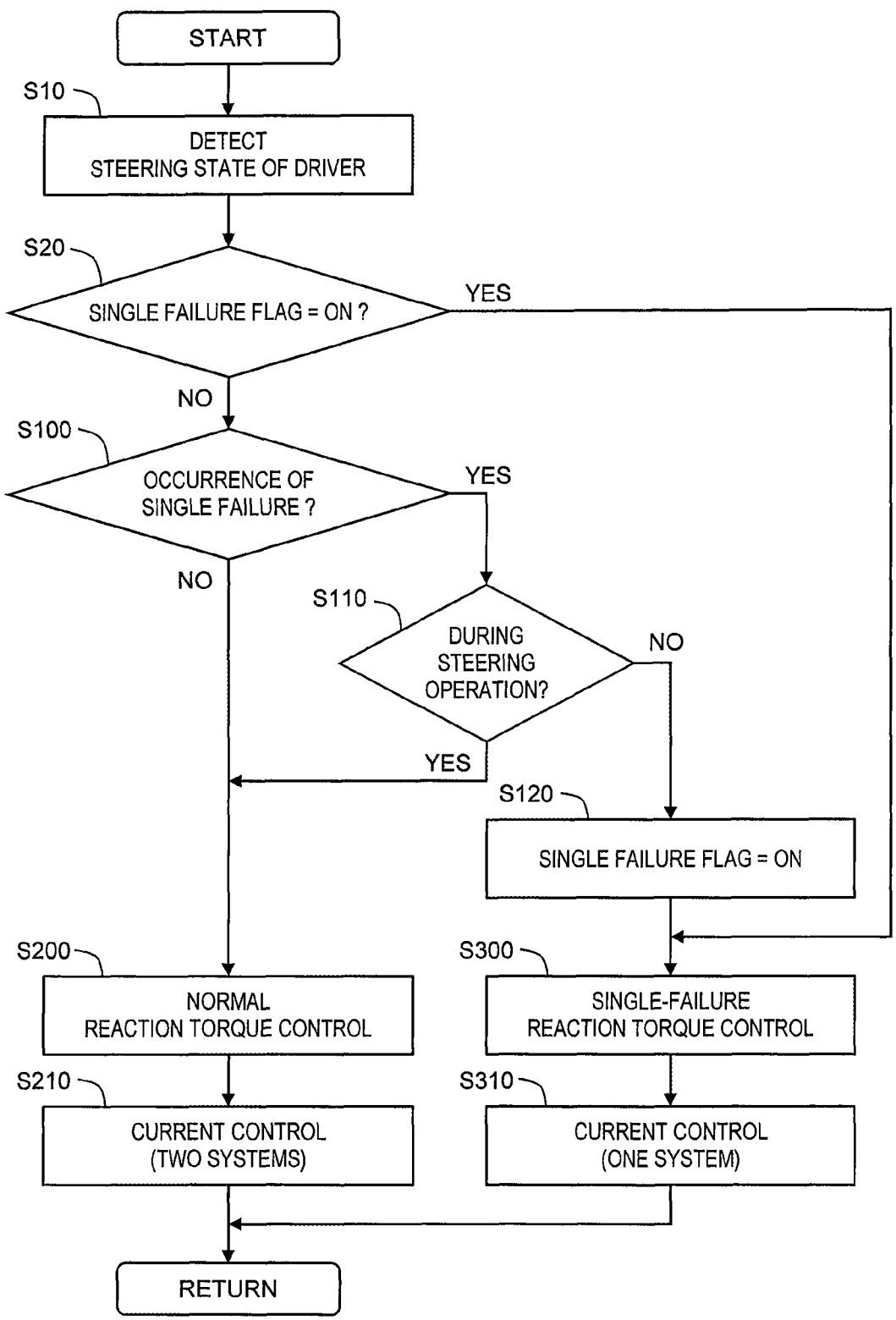
FIG. 11 is a flow chart for explaining an example of a characteristic change timing according to the embodiment of the present disclosure.

As another example, the control device 100 may change the reaction torque characteristic from the normal characteristic Cn to the first characteristic C1 in a period when the driver does not operate the steering wheel 10. FIG. 11 shows an example of a processing flow for changing the reaction torque characteristic in a period when the driver does not operate the steering wheel 10. It should be noted that the same Step number is given to the same processing as shown in the foregoing FIG. 4.

In Step S10, the control device 100 detects a steering state of the driver. The steering state of the driver is represented by a parameter such as the steering torque T, the steering angle θ, and a steering angular velocity θ'. The steering torque T is detected by the steering torque sensor 52. The steering angle θ is detected by the steering angle sensor 51. The steering angular velocity θ' is calculated from the steering angle θ.

In a subsequent Step S20, the control device 100 checks a single failure flag. An initial value of the single failure flag is "OFF". When the single failure flag is "OFF" (Step S20; No), the processing proceeds to Step S100. On the other hand, when the single failure flag is "ON" (Step S20; Yes), the processing proceeds to Step S300.

In Step S100, the control device 100 determines whether or not the single failure occurs. When the single failure has not occurred (Step S100; No), the processing proceeds to Step S200. On the other hand, when the single failure occurs (Step S100; Yes), the processing proceeds to Step S110.

In Step S110, the control device 100 determines whether or not the driver is operating the steering wheel 10. For example, when absolute values of the steering torque T, the steering angle θ, and the steering angular velocity θ' are equal to or less than threshold values, respectively, the control device 100 determines that the driver is not operating the steering wheel 10. Otherwise, the control device 100 determines that the driver is operating the steering wheel 10.

When the driver is operating the steering wheel 10 (Step S110; Yes), the control device 100 continues the normal reaction torque control (Step S200). On the other hand, when the driver is not operating the steering wheel 10 (Step S110; No), the control device 100 rewrites the single failure flag to "ON" (Step S120), and then starts the single-failure reaction torque control (Step S300).

In this manner, it is possible to change the reaction torque characteristic from the normal characteristic Cn to the first characteristic C1 in the period when the driver does not operate the steering wheel 10. In other words, it is possible to prevent the reaction torque characteristic from being changed abruptly in the period when the driver operates the steering wheel 10.

What is claimed is:

1. A steer-by-wire system mounted on a vehicle, comprising: a turning device configured to turn a wheel of the vehicle;
   a steering reaction torque generation device mechanically separated from the turning device and configured to apply a reaction torque to a steering wheel; and
   a control device configured to control the reaction torque by controlling an operation of the steering reaction torque generation device in response to an operation of the steering wheel, wherein:
   the steering reaction torque generation device has a duplex configuration including a first system and a second system, each of the first system and the second system comprising a reaction torque motor;
   in a case where both the first system and the second system are normal, the control device generates the reaction torque according to a normal characteristic where a relationship between a steering angle and the reaction torque is represented by a normal curve, by controlling an operation of the reaction torque motor of at least one of the first system and the second system based on the normal characteristic; and
   in a case of single failure where one of the first system and the second system fails, the control device generates the reaction torque according to a first characteristic where the relationship between the steering angle and the reaction torque is represented by a first curve different from the normal curve, by controlling an operation of the reaction torque motor of a system that is not failed based on the first characteristic.

2. The steer-by-wire system according to claim 1, wherein each of the normal characteristic and the first characteristic has a tendency that the reaction torque increases as the steering angle increases.

3. The steer-by-wire system according to claim 1, wherein a second characteristic is a characteristic of the reaction torque in a case of double failure where both the first system and the second system fail, and
the first characteristic is an intermediate characteristic between the normal characteristic and the second characteristic.

4. The steer-by-wire system according to claim 1, wherein the reaction torque having the first characteristic is smaller than the reaction torque having the normal characteristic with respect to a same steering angle.

5. The steer-by-wire system according to claim 1, wherein the reaction torque having the first characteristic is larger than the reaction torque having the normal characteristic with respect to a same steering angle.

6. The steer-by-wire system according to claim 1, wherein:
   when controlling the operation of the reaction torque motor to generate the reaction torque, the control device performs torque ripple suppression control to suppress torque ripple; and
   the control device sets a control gain of the torque ripple suppression control in the case of the single failure to be lower than in the case where both the first system and the second system are normal.

7. The steer-by-wire system according to claim 1, wherein the control device changes a characteristic of the reaction torque from the normal characteristic to the first characteristic in a period when a driver of the vehicle does not operate the steering wheel after the single failure occurs.

8. The steer-by-wire system according to claim 1, wherein:
- a second characteristic is a characteristic of the reaction torque in a case of double failure where both the first system and the second system fail;
- a first steering angle range is a range of the steering angle from 0 to a predetermined value;
- a second steering angle range is a range of the steering angle larger than the predetermined value;
- the reaction torque having the first characteristic in the first steering angle range is larger than the reaction torque having the normal characteristic with respect to a same steering angle and smaller than the reaction torque having the second characteristic with respect to a same steering angle; and
- the reaction torque having the first characteristic in the second steering angle range is smaller than the reaction torque having the normal characteristic with respect to a same steering angle and larger than the reaction torque having the second characteristic with respect to a same steering angle.

9. The steer-by-wire system according to claim 8, wherein when the single failure occurs, the control device increases or decreases responsiveness of current control of the reaction torque motor.

* * * * *